2,755,220

HEXITOL-STABILIZED MILK OF MAGNESIA PREPARATION

Charles E. Alford, Delmar, and Emil T. Hinkel, Jr., Elsmere, N. Y., assignors to Sterling Drug Inc., New York, N. Y., a corporation of Delaware No Drawing. Application December 29, 1953, Serial No. 401,079

5 Claims. (Cl. 167—56)

This invention relates to an aqueous gastric antacid and laxative preparation comprising magnesium hydroxide as the active medicinal ingredient and a hexitol as a stabilizing and flavoring agent.

Aqueous preparations containing magnesium hydroxide have been sold commercially for over eighty years, e. g., milk of magnesia. Nevertheless, in spite of its long continued use, aqueous magnesium hydroxide does have minor disadvantages that have persisted over all these years. For one thing, it has a tendency to flocculate or coagulate upon standing, in particular, when allowed to freeze and then to thaw. Also, it has a chalky taste that still remains after many unsuccessful attempts to make it more palatable.

We have now found that an aqueous colloidal liquid magnesium hydroxide preparation containing a relatively minor quantity of a hexitol not only is more pleasing to taste but also remains stable even when frozen. We have found that the undesirable flocculation or coagulation of magnesium hydroxide can be prevented by incorporating a hexitol, such as sorbitol or mannitol, in the preparation. The magnesium hydroxide of our preparations remains in its dispersible state upon freezing and thawing, unlike the hydroxide of said preparations containing no hexitol. Similarly, our hexitol-containing preparations are more palatable than the corresponding preparations that contain no hexitol.

Moreover, our hexitol-containing preparations have the added advantage of freezing slowly and incompletely, thereby expanding to conform to the shape of the container. Since milk of magnesia is stored and sold in glass containers, this "soft" freezing of our preparation makes it decidedly superior to ordinary commercial milk of magnesia preparations which freeze so rapidly and completely as to crack or break glass containers.

Preferred embodiments of our invention are milk of magnesia preparations containing sorbitol or mannitol as the stabilizing and flavoring agent. Sorbitol is also known as D-sorbitol, sorbit, sorbol or D-glucitol; mannitol is also known as D-mannitol, mannite or manna sugar.

We have found that as little as about 2% by weight of a hexitol results in an improved milk of magnesia and that about 5 to 15% by weight of the hexitol is the preferred range. Of course, larger quantities of the hexitol can be employed, although this is unnecessary and uneconomical.

The following example will illustrate specific embodiments of our invention without, however, limiting it thereto. All parts are given by weight.

*Example*

A stable, palatable formulation was prepared by mixing 40 parts of water with 10 parts of "Sorbo" (70% solution of sorbitol in water) and adding thereto 50 parts of an aqueous suspension of 19% magnesium hydroxide. The resulting formulation was stored in screw-capped bottles and placed in a refrigerator (at about 8–10° F.) until frozen. When allowed to thaw, this formulation resumed its pre-freezing fluid character. A corresponding formulation that contained no sorbitol, unlike the sorbitol-containing preparation, froze so rapidly and completely that it either broke or cracked the bottles containing it. Also, thawing of these formulations having no sorbitol resulted in a mixture containing the magnesium hydroxide in flocculent or coagulated form.

Other equally satisfactory formulations can be prepared using 5, 10 or 15% of sorbitol; or by replacing sorbitol with corresponding quantities of mannitol; or by using 50 parts of a 14% or a 17% suspension of magnesium hydroxide in water in place of the 50 parts of 19% magnesium hydroxide.

We claim:

1. An aqueous colloidal liquid gastric antacid and laxative preparation comprising magnesium hydroxide and a hexitol as a stabilizing agent.

2. An aqueous colloidal liquid gastric antacid and laxative preparation comprising magnesium hydroxide and sorbitol as a stabilizing agent.

3. An aqueous colloidal liquid gastric antacid and laxative preparation comprising magnesium hydroxide and mannitol as a stabilizing agent.

4. Milk of magnesia containing about 5–15% of sorbitol as a stabilizing agent adapted to stabilize the magnesium hydroxide in suspension in a liquid.

5. Milk of magnesia containing about 5–15% of mannitol as a stabilizing agent adapted to stabilize the magnesium hydroxide in suspension in a liquid.

References Cited in the file of this patent

UNITED STATES PATENTS 2,087,006   Riggs _____ July 13, 1937

OTHER REFERENCES

Speel: American Journal of Pharmacy, April 1941, pages 134 to 141.